United States Patent [19]

Clavel

[11] Patent Number: 4,976,582

[45] Date of Patent: Dec. 11, 1990

[54] DEVICE FOR THE MOVEMENT AND POSITIONING OF AN ELEMENT IN SPACE

[75] Inventor: Reymond Clavel, Ecublens, Switzerland

[73] Assignee: Sogeva S.A., Switzerland

[21] Appl. No.: 403,987

[22] Filed: Sep. 6, 1989

Related U.S. Application Data

[63] Continuation of Ser. No. 96,113, Aug. 13, 1987, abandoned.

[30] Foreign Application Priority Data

Dec. 16, 1985 [CH] Switzerland .................. 5348/85

[51] Int. Cl.$^5$ .............................................. B25J 9/12
[52] U.S. Cl. ..................................... 414/729; 901/23; 901/28; 248/179; 108/20; 108/138; 74/479
[58] Field of Search ........................ 414/728, 729, 735; 901/23, 24, 25, 28, 14; 248/179, 654; 108/201, 138; 74/479

[56] References Cited

U.S. PATENT DOCUMENTS

| | | | |
|---|---|---|---|
| 2,286,571 | 6/1942 | Pollard | 901/15 |
| 3,419,238 | 12/1968 | Flory | 248/163.1 |
| 4,407,625 | 10/1983 | Shum | 414/728 |
| 4,435,116 | 3/1984 | Van Deberg | 414/728 |
| 4,569,627 | 2/1986 | Simunovic | 414/735 |
| 4,651,589 | 3/1987 | Lambert | 901/22 X |
| 4,712,971 | 12/1987 | Fyler | 414/744 R |

FOREIGN PATENT DOCUMENTS 0422580 9/1974 U.S.S.R. .................. 901/28

OTHER PUBLICATIONS

Mechanisms, Linkages, and Mechanical Controls, Nichols P. Chironis, copyright 1965, Scientific Library U.S. PTO, pp. 326–329.

Primary Examiner—Robert J. Spar
Assistant Examiner—Donald W. Underwood
Attorney, Agent, or Firm—Willian Brinks Olds Hofer Gilson & Lione

[57] ABSTRACT

The device comprises a base element (1) and a movable element (8). Three control arms (4) are rigidly mounted at their first extremity (15) on three shafts (2) which may be rotated. The three assemblies each formed by a shaft (2) and an arm (4) are the movable parts of three actuators (13) of which the fixed parts (3) are integral with the base element. The other extremity (16) of each control arm is made integral with the movable element through two linking bars (5a, 5b) hingedly mounted on the one hand to the second extremity (16) of the control arm and, on the other hand, to the movable element. The inclination and the orientation in space of the movable element remain unchanged, whatever the motions of the three control arms may be. The movable element supports a working element (9) of which the rotation is controlled by a fixed motor (11) situated on the base element. A telescopic arm (14) connects the motor to the working element.

25 Claims, 4 Drawing Sheets

FIG_5

DEVICE FOR THE MOVEMENT AND POSITIONING OF AN ELEMENT IN SPACE

This application is a continuation of application Ser. No. 07/096,113, filed Aug. 13, 1987, now abandoned.

BACKGROUND OF THE INVENTION

The invention is concerned with a device for the movement and positioning of an element in space.

The majority of devices of the above type which are known, such, for example, as the main known industrial robots, include a carrier member which supports a wrist, the carrier member having three axes known as the main axes, intended for defining three degrees of freedom which may be rotations and/or translations, so as to position the wrist in space, the orientation of the said wrist being in turn controlled by one to three axes known as the secondary axes, in accordance with one to three supplementary degrees of freedom which are necessarily rotations.

In these devices, the configuration of the carrier member of which may be of cartesian type having cylindrical coordinates or spherical coordinates or of SCARA (Selective Compliance Assembly Robot) type or having angular coordinates, the control of the degrees of freedom is effected in series. The first main axis is employed as a reference for the motion of the second main axis, the latter serving as a reference for the motion of the third main axis which in turn serves as a reference for the degrees of freedom which define the orientation of the wrist.

The configuration in series necessitates the location of the driving motors at the level of each axis or demands a heavy and complicated configuration for the transmission of the motion to the axes, and, consequently, even in the case of the movement of a small load, large masses must be set in motion.

On the other hand a device is known having a configuration similar to that of a flight simulator, having six axes working in parallel. In this case, the motors may be fixed, which limits the masses to be set in motion. This species of device, however, enables only a very restricted working volume to be reached.

A device in which the control of the three basic degrees of freedom is effected in parallel is described in the patent U.S. Pat. No. 2,286,571. This device is intended for the positioning and t control of the motion of a paint gun. It comprises three actuators integral with one base member, each of the actuators including one fixed portion and one moving arm mounted in rotation at one end of it on the fixed portion of the actuator. On the second end of each of the arms are mounted respectively three linking bars by way of articulations of cardan type mounted respectively at one of the ends of the linking bars. Two of the linking bars are mounted by articulation at their respective second ends onto the third linking bar, near to the second end of it. The support for the gun is mounted by articulation at the end of the third linking bar.

The Patent Application FR-A-2,550,985 describes another device in which the control o the three basic degrees of freedom is effected in parallel. This document concerns an arm able to extend, retract and fold, composed of a plurality of extensible members mounted in series, each of them including three actuators acting in parallel.

The known devices are, however, poorly adapted to the transfer of light pieces at very high rates.

SUMMARY OF THE INVENTION

The aim of the present invention is to propose a device for the movement and positioning of an element in space, and in particular an industrial robot of new and advantageous configuration which enables the control of the three basic degrees of freedom in parallel from actuators arranged on a fixed support, whilst preserving the parallelism of the moving member with respect to the fixed support, and which is particularly adapted to the transfer of light pieces at very high rates. None of the known devices offers such characteristics.

For this purpose the present invention is concerned with a device for the movement and positioning of an element in space, including at least one base member, at least one movable member and at least three actuators each of which comprises one fixed portion and one moving portion, the fixed portion of each actuator being integral with the base member, the moving portion of each of them being connected to the movable member by way of a linking member, each of the linking members being mounted by articulation firstly onto the moving portion of the actuator and mounted by articulation secondly onto the movable member, the whole being arranged so that the inclination and the orientation in space of the movable member remain unchanged, whatever the motions of the moving portions of the actuators may be, so as to constitute a deformable space-parallelogram.

In accordance with a first form of the invention, the moving portion of each actuator is mounted to rotate about a shaft integral with the fixed portion of the said actuator.

In accordance with a second form of the invention, the moving portion of each actuator is mounted in translation with respect to the fixed portion of the said actuator, and the said moving portion is arranged so as to prevent its rotation about the axis of the motion of translation.

In accordance with a characteristic of the invention, the device includes a working member integral with the movable member and a supplementary motor intended for controlling the rotation of the working member about its longitudinal axis.

In accordance with a form of the invention, at least one of the linking members include two parallel bars, each of the said bars being mounted at one end of it by articulation onto one end of the moving portion of the actuator, the other end of each of the said bars being mounted by articulation onto the movable member, whence it results that the two parallel bars constitute a deformable parallelogram. The articulations of the parallel bars may be ball-and-socket joints or articulations of cardan type.

In accordance with another form of the invention, at least one of the linking members includes one single bar mounted at its first end on the moving portion of the actuator by way of a first articulation of cardan type, and mounted at its second end on the movable member by way of a second articulation of cardan type.

The supplementary motor may be attached to the base member or to the moving member.

The device may be arranged so as to enable the measurement of a displacement in space.

The advantages of the device of the invention are multiple. One of the main advantages is that the volume which can be reached is large and that the masses in motion are reduced to a minimum. This configuration enables the movement of pieces the total mass of which is of the same order as the inertia of the moving parts of the device. The operating rates may be very high. The presence of the three moving portions of the actuators acting in parallel constitutes an increase in the stiffness of the mechanism, which, at an equal rate of operation, enables better repeatability of position than that obtained with the majority of known industrial robots, even at high speed.

DESCRIPTION OF THE PREFERRED EMBODIMENTS

Figure 1:
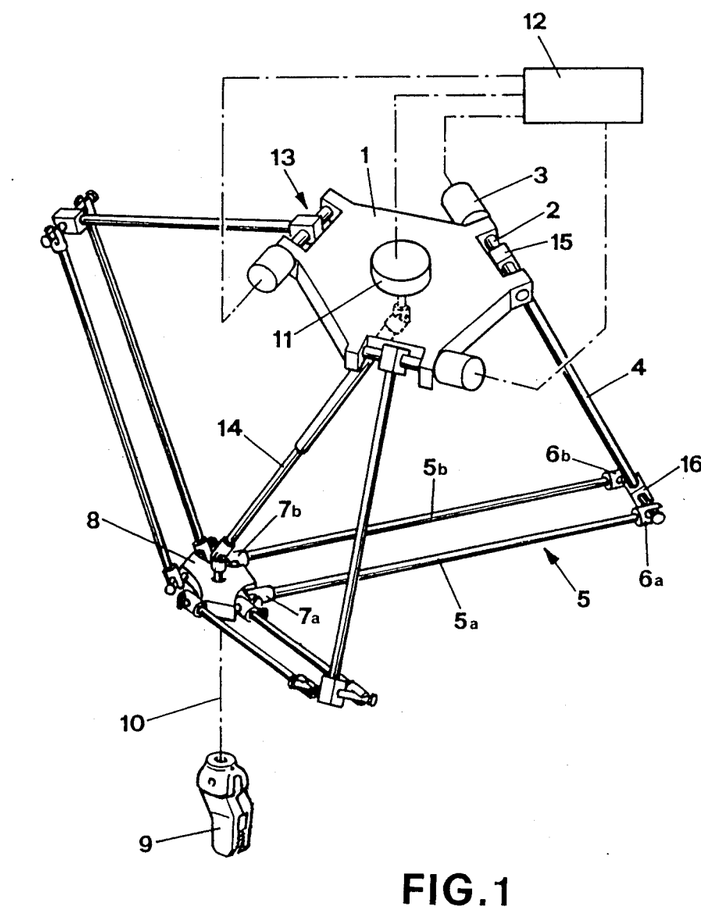
FIG. 1 is a perspective view of a device according to a first embodiment.

Referring to FIG. 1, the device includes one base member 1 and one movable member 8. The base member 1 includes three rotary actuators 13 each including one fixed portion 3 integral with the base member 1, the axes 2 of which are coplanar. Control arms 4 are mounted in the form of a rigid assembly at one end 15 of them respectively on each of the axes of rotation 2, so that the longitudinal axis of each arm is perpendicular to its corresponding axis of rotation 2. The other end 16 of each of the control arms 4 is integral with two linking bars 5a, 5b by way of two double articulations in cardan form 6a, 6b. Each of the two groups of linking bars 5a, 5b is connected otherwise by way of two double articulations 7a, 7b, of cardan type to the movable member 8 the movement of which may thus be controlled by the motion of the control arms 4. In a second embodiment shown in FIG. 2, the articulations 6a, 6b and 7a, 7b, may be replaced by ball-and-socket joints 26a, 26b and 27a, 27b.

Figure 3:
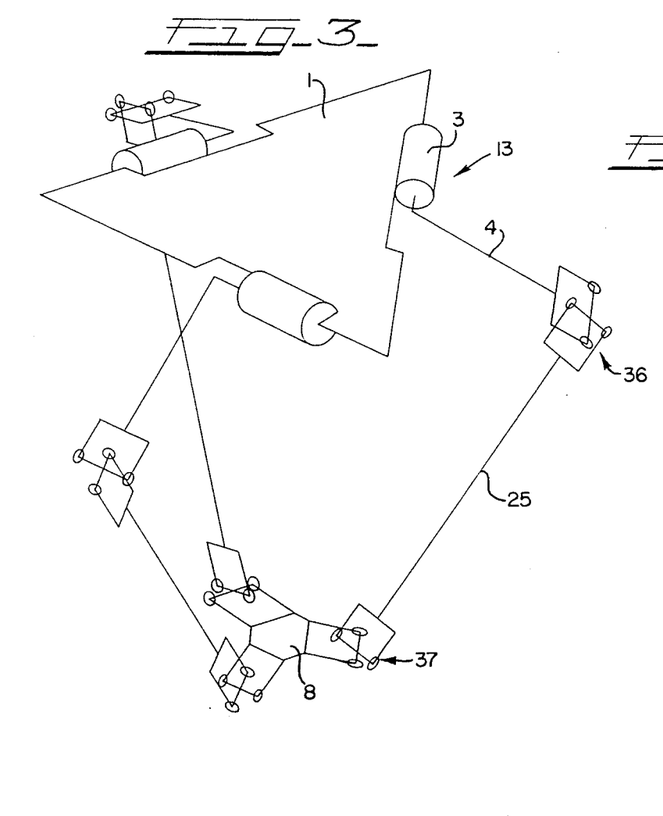
FIG. 3 is a schematic illustration of a perspective view according to a third embodiment.
Figure 4:
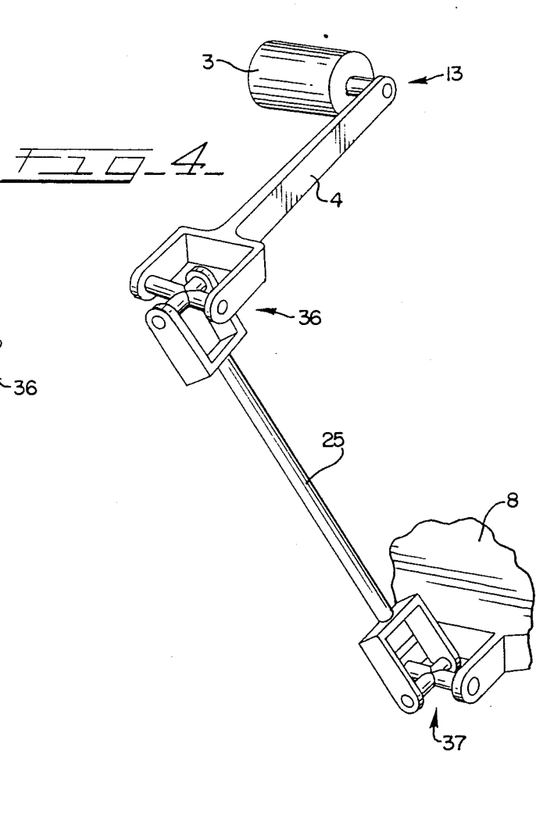
FIG. 4 is a perspective view of an actuator and a linking member of the third embodiment.

In the configuration represented in FIG. 1, the linking bars 5a, 5b remaining constantly in parallel form the sides of a parallelogram which moves in space and is deformable as a function of the respective motions of the control arms 4. The result is that the movable member 8 remains in parallel with itself, whatever the motions of the control arms may be. As shown in FIGS. 3 and 4, the same configuration may be obtained in a third embodiment in which if the pairs of linking bars 5a, 5b are replaced by single oars 25, each of the bars 25 be mounted by way of an articulation 36, 37 of cardan type fixed respectively to each of their ends, on the one hand onto one of the control arms 4 and on the other hand onto the movable member 8 respectively.

The three actuators 13 are connected by way of adequate amplifiers to a managing computer 12 intended for controlling the motions of the control arms 4.

Figure 2:
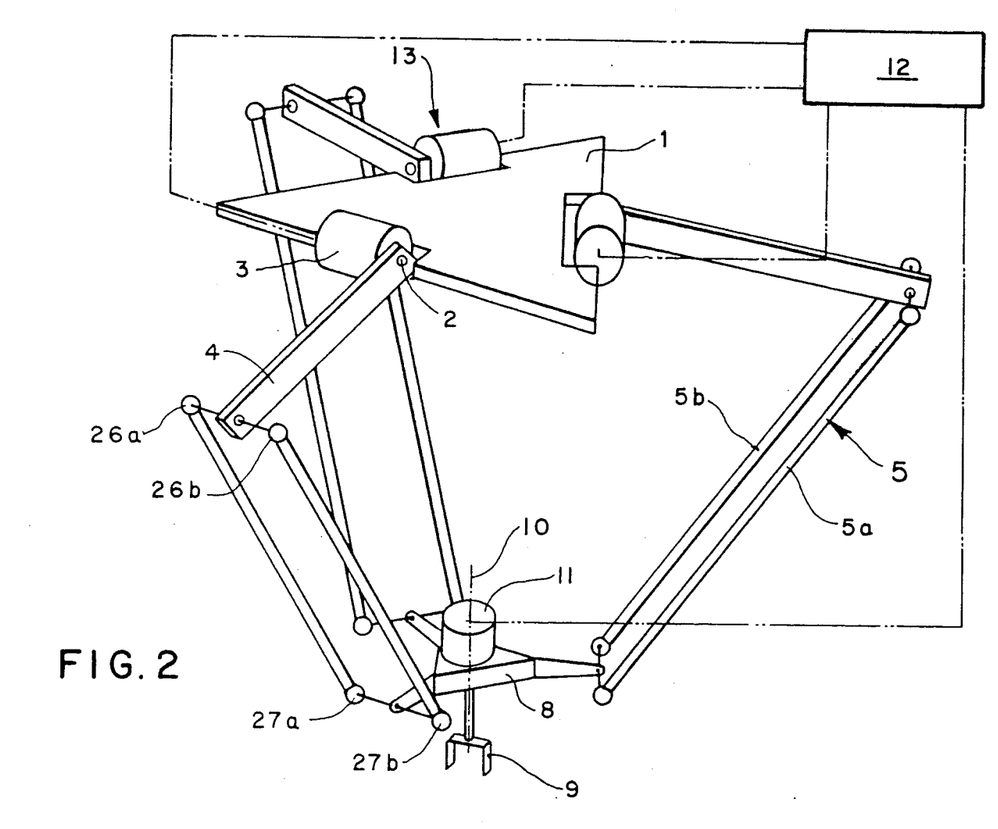
FIG. 2 is a similar view of a device according to a second embodiment.

A working member 9 such, for example, as a gripping member, a tool, a sucker or a syringe may be arranged on the movable member 8. In the example represented in FIG. 1, a fourth degree of freedom of the device consists in the rotation of the working member about an axis 10 perpendicular to the movable member 8. This rotation is controlled by a fixed motor 11 arranged on the base member 1, the rotation being controlled by way of a rod system (for example, a telescopic arm 14) and other transmission members Of course in accordance with another variant, as shown in FIG. 2, the motor 11 may be attached to the movable member 8 and connected to the managing computer In accordance with another variant execution of the device of FIG. 1, but not shown, the configuration described above may be completed by providing the control of the two supplementary degrees of freedom intended for the tilting of the working member in space. The corresponding driving motors may be fixed onto the base member 1, the transmission of the motion to the working member being effected by a system of rods and/or belts, cardan joints and other transmission members. These motors may also be attached directly to the movable member 8, the motors being connected to the managing computer.

Figure 5:
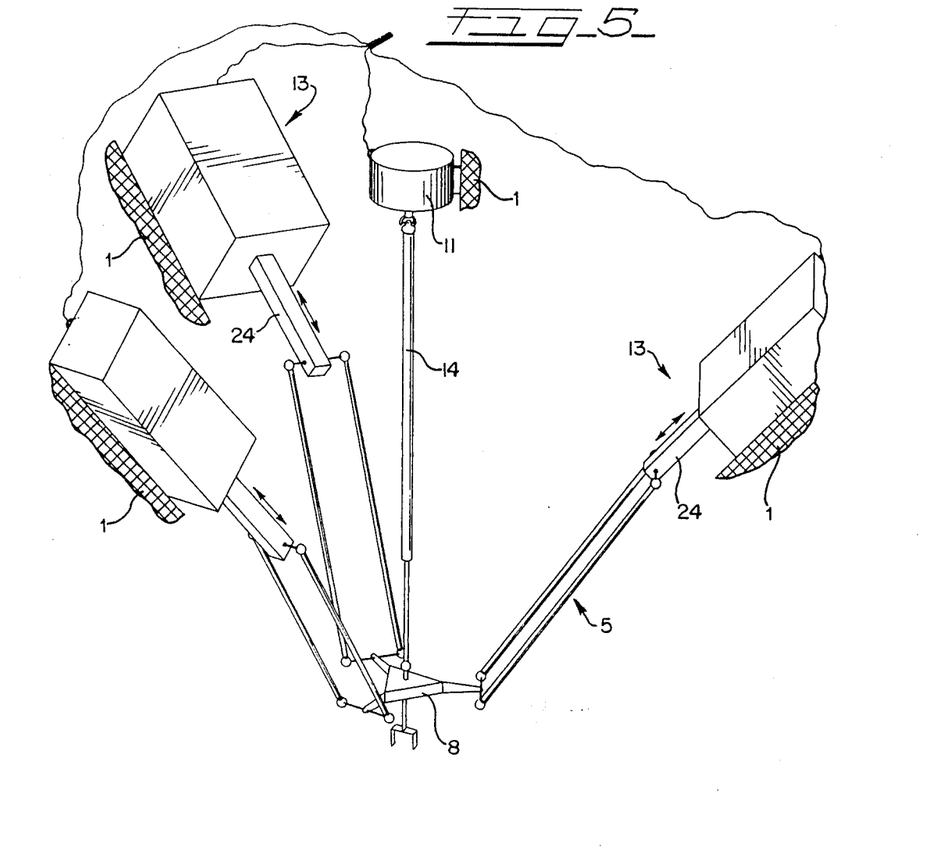
FIG. 5 is a perspective view of a device according to a fourth embodiment.

In accordance with another embodiment of the device, shown in FIG. 5, the control arms 4, which, in the example shown in FIG. 1, constitute moving portion turning about axes 2, may be replaced by members 24 moving on straight guides.

In the configuration of the device of the invention represented in FIG. 1, the ends of the three control arms integral with the base member 1 are arranged in accordance with an equilateral triangle, Of course this arrangement is in no way exhaustive. On the other hand, although the device has been represented with one base member and one movable member in the form of plates arranged horizontally, these members may have various forms and be oriented in any positions whatever.

The device of the invention may be employed in very wide fields of application. O(ne may mention, for example:

the assembly of printed circuits of every kind;
any field necessitating accurate and rapid assembly;
the handling and packing of parts of every kind;
the determination of a position in space intended, for example, for the measurement of a displacement or for a dimensional checking of pieces, etc.

I claim:

1. A device for the movement and positioning of an element in space, comprising:
    at least one base member;
    at least one movable member;
    at least three actuators, each actuator comprising a fixed portion, substantially immovably fixed on the base member, and a moving portion having a single degree of freedom with respect to said fixed portion; and
    means fixing in space the inclination and orientation of the movable member with respect to the base member for all motions of the moving portions of the actuators, said fixing means comprising at least three linking means respectively connecting the moving portion of each actuator to the movable member, each of the linking means having a first end mounted by articulation onto the moving portion of its respective actuator and a second end mounted by articulation onto the movable member, the device providing two and only two degrees of freedom between the first end of each linking means and the moving portion of its respective actuator, the device providing two and only two degrees of freedom between the second end of each linking means and the movable member.

2. A device according to claim 1, at least one of the linking means comprising two parallel bars, each of said bars being mounted at a first end thereof by articulation onto the moving portion of its respective actuator, a second end of each of said bars being mounted by articulation onto the movable member.

3. A device according to claim 2, wherein the moving portion of each actuator is mounted for rotation about an axis of the fixed portion of the said actuator.

4. A device as in claim 2, wherein the moving portion of each actuator is mounted for linear translation with respect to the fixed portion thereof and is fixed against rotation thereof about an axis defined by the motion of translation.

5. A device as in claim 1, at least one of the linking means comprising a single bar, a first end of said single bar being mounted on the moving portion of its respective actuator by a first articulation of cardan type, a second end of said single bar being mounted on the movable member by a second articulation of cardan type.

6. A device as in claim 5, wherein the moving portion of each actuator is mounted for rotation about an axis of fixed portion of the said actuator.

7. A device as in claim 5, wherein the moving portion of each actuator is mounted for linear translation with respect to the fixed portion thereof and is fixed against rotation thereof about 8. A device as in one of claims 3, 4, 6 or 7, further comprising a working member rotatably mounted on the movable member and a supplementary motor for rotating the working member about a longitudinal axis of the working member, the supplementary motor being mounted on the base member.

9. A device as in one of claims 3, 4, 6 or 7, further comprising a working member rotatably mounted on the movable member and a supplementary motor for rotating the working member about a longitudinal axis of the working member, the supplementary motor being mounted on the movable member.

10. A device as in one of claims 3 or 4, wherein said at least one linking means is mounted by articulation of cardan type onto the moving portion of its respective actuator.

11. A device as in one of claims 3 or 4, wherein said at least one linking means is mounted by articulation of ball-and-socket type onto the moving portion of its respective actuator.

12. A device as in one of claims 3 or 4, wherein said at lest one linking means is mounted by articulation of cardan type onto the movable member.

13. A device as in one of claims 3 or 4, wherein said at least one linking means is mounted by articulation of ball-and-socket type onto the movable member.

14. A device for the movement and positioning of an element in space, comprising:
   at least one base member;
   at least one movable member;
   at least three actuators, each actuator comprising a fixed portion, substantially immovably fixed on the base member, and a moving portion mounted for rotation about an axis of the fixed portion of the actuator; and
   at least three linking means respectively connecting the moving portion of the actuators to the movable member, at least one of the linking means comprising two parallel bars, said at least one linking means being mounted at a first end thereof by articulation of cardan type onto an end of the moving portion of its respective actuator, a second end of said at least one linking means being mounted onto the movable member by articulation providing two and only two degrees of freedom between the at least one linking means and the movable member.

15. A device for the movement and positioning of an element in space comprising:
   at least one base member;
   at least one movable member;
   at least three actuators, each actuator comprising a fixed portion, substantially immovably fixed on the base member, and a moving portion mounted for rotation about an axis of the fixed portion of the actuator; and
   at least three linking means respectively connecting the moving portion of the actuators to the movable member, at least one of ,the linking means comprising two parallel bars, said at least one linking means being mounted at a first end thereof by articulation of cardan type onto the movable member, a second end of said at least one linking means being mounted onto the moving portion of its respective actuator by articulation providing two and only two degrees of freedom between the at least one linking means and the moving portion of the actuator.

16. A device for the movement and positioning of an element in space, comprising.
   at least one base member;
   at least one movable member;
   at least three actuators, each actuator comprising a fixed portion, substantially immovably fixed on the base member, and a moving portion mounted for rotation about an axis of the fixed portion of the actuator; and
   at least three linking means respectively connecting the moving portion of the actuators to the movable member, at least one of the linking means comprising two parallel bars, said at least one linking means being mounted at a first end thereof by articulation of ball-and-socket type onto an end of the moving portion of its respective actuator, a second end of said at least one linking means being mounted onto the movable member by articulation providing two and only two degrees of freedom between the at least one linking means and the movable member.

17. A device for the movement and positioning of an element in space comprising:
   at least one base member;
   at least one movable member;
   at least three actuators, each actuator comprising a fixed portion, substantially immovably fixed on the base member, and a moving portion mounted for rotation about an axis of the fixed portion of the actuator; and
   at least three linking means respectively connecting the moving portion of the actuators to the movable member, at least one of the linking means comprising two parallel bars, said at least one linking means being mounted at a first end thereof by articulation of ball-and-socket type onto the movable member, a second end of said at least one linking means being mounted onto the moving portion of its respective actuator by articulation providing two and only two degrees of freedom between the at least one linking means and the moving portion of the actuator.

18. A device for the movement and positioning of an element in space, comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising two parallel bars, said at least one linking means being mounted at a first end thereof by universal joint articulation onto an end of the moving portion of its respective actuator, a second end of said at least one linking means being mounted onto the movable member by articulation providing two and only two degrees of freedom between the at least one linking means and the movable member.

19. A device for the movement and positioning of an element in space comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising two parallel bars, said at least one linking means being mounted at a first end thereof by universal joint articulation onto the movable member, a second end of said at least one linking means being mounted onto the moving portion of its respective actuator by articulation providing two and only two degrees of freedom between the at least one linking means and the moving portion of the actuator.

20. A device for the movement and positioning of an element in space, comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising two parallel bars, both of said bars being mounted at a first end thereof by universal joint articulation onto an end of the moving portion of its respective actuator, a second end of both of said bars being mounted by articulation onto the movable member so as to provide two and only degrees of freedom between said at least one linking means and the movable member.

21. A device for the movement and positioning of an element in space comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising two parallel bars, both of said bars being mounted at a first end thereof by universal joint articulation onto the movable member, a second end of both of said bars being mounted by articulation onto the moving portion of its respective actuator so as to provide two and only two degrees of freedom between said at least one linking means and the movable member.

22. A device for the movement and positioning of an element in space, comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising a single bar, said single bar of at least one of said linking means being mounted at a first end thereof by articulation of cardan type onto an end of the moving portion of its respective actuator, a second end of said bar being mounted onto the movable member by articulation providing two and only two degrees of freedom.

23. A device for the movement and positioning of an element in space comprising:
- at least one base member;
- at least one movable member;
- at least three actuators, each actuator comprising a fixed portion, substantially immovably fixed on the base member, and a moving portion mounted for rotation about an axis of the fixed portion of the actuator; and
- at least three linking means respectively connecting the moving portion of the actuators to the movable member, at least one of the linking means comprising a single bar, said single bar of at least one linking means being mounted at a first end thereof by articulation of cardan type onto the movable member, a second end of said bar being mounted onto the moving portion of its respective actuator by articulation providing two and only two degrees of freedom.

24. A device as in one of claims 14–23, further comprising a working member rotatably mounted on the movable member and a supplementary motor for rotating the working member about a longitudinal axis of the working member, the supplementary motor being mounted on the base member.

25. A device as in one of claims 14–23, further comprising a working member rotatably mounted on the movable member and a supplementary motor for rotating the working member about a longitudinal axis of the working member, the supplementary motor being mounted on the movable member.

* * * * *

UNITED STATES PATENT AND TRADEMARK OFFICE
CERTIFICATE OF CORRECTION

PATENT NO. : 4,976,582

DATED : December 11, 1990

INVENTOR(S) : Reymond Clavel

It is certified that error appears in the above-identified patent and that said Letters Patent is hereby corrected as shown below:

In column 1, line 49, before "control" please delete "t" and substitute therefor --the--.

In column 1, line 63, after "control" please delete "o" and substitute therefor --of--.

In column 3, line 55, please delete "oars" and substitute therefor --bars--; and delete "be" and substitute therefor --being--.

In column 4, line 7, after "computer" please insert --.--.

In column 4, line 37, please delete "O(ne" and substitute therefor --One--.

<u>IN THE CLAIMS</u>

In claim 6, column 5, line 26, before "fixed" please insert --the--.

UNITED STATES PATENT AND TRADEMARK OFFICE
CERTIFICATE OF CORRECTION

PATENT NO. : 4,976,582
DATED : December 11, 1990
INVENTOR(S) : Reymond Clavel Page 2 of 2

It is certified that error appears in the above-identified patent and that said Letters Patent is hereby corrected as shown below:

In claim 7, column 5, line 30, after "about" please insert --an axis defined by the motion of translation.--

In claim 15, column 6, line 20, after "of" please delete --,--.

Signed and Sealed this

Fourth Day of August, 1992

*Attest:*

DOUGLAS B. COMER

*Attesting Officer*     *Acting Commissioner of Patents and Trademarks*